United States Patent
Yang et al.

(10) Patent No.: US 11,522,457 B2
(45) Date of Patent: Dec. 6, 2022

(54) BUCK-BOOST CONVERTER AND CONTROL METHOD

(71) Applicant: M3 Technology Inc., Taipei (TW)

(72) Inventors: Bo Yang, Allen, TX (US); Xiaoyu Xi, Dallas, TX (US); David Meng, Los Altos, CA (US)

(73) Assignee: M3 Technology Inc., Taipei (TW)

( * ) Notice: Subject to any disclaimer, the term of this patent is extended or adjusted under 35 U.S.C. 154(b) by 141 days.

(21) Appl. No.: 17/149,168

(22) Filed: Jan. 14, 2021

(65) Prior Publication Data

US 2021/0184577 A1 Jun. 17, 2021

Related U.S. Application Data

(63) Continuation of application No. 16/716,681, filed on Dec. 17, 2019, now Pat. No. 10,992,231.

(51) Int. Cl.
| | | |
|---|---|---|
| *H02M 3/158* | (2006.01) | |
| *H02M 1/08* | (2006.01) | |
| *H02M 3/157* | (2006.01) | |
| *H02M 1/38* | (2007.01) | |
| *H02M 1/00* | (2006.01) | |

(52) U.S. Cl.
CPC ........... *H02M 3/1582* (2013.01); *H02M 1/08* (2013.01); *H02M 1/38* (2013.01); *H02M 3/157* (2013.01); *H02M 1/0009* (2021.05)

(58) Field of Classification Search
CPC ........ H02M 3/1582; H02M 1/08; H02M 1/38; H02M 3/157; H02M 1/0009; H02M 1/0022
See application file for complete search history.

(56) References Cited

U.S. PATENT DOCUMENTS

| | | | |
|---|---|---|---|
| 2011/0199062 A1 | 8/2011 | Singnurkar | |
| 2012/0105030 A1* | 5/2012 | Chen | H02M 3/156 323/271 |
| 2014/0217996 A1* | 8/2014 | Peker | H02M 3/1582 323/271 |

\* cited by examiner

*Primary Examiner* — Adolf D Berhane
*Assistant Examiner* — Afework S Demisse
(74) *Attorney, Agent, or Firm* — Slater Matsil, LLP

(57) ABSTRACT

An apparatus includes a buck-boost converter comprising a buck portion and a boost portion connected in cascade, and a controller comprising a first timer and a second timer, wherein the first timer is configured to determine a turn-on time of a high-side switch of the buck portion, and wherein the first timer determines the turn-on time of the high-side switch of the buck portion based on a comparison between a first signal and a second signal, and wherein the first signal is proportional to an output voltage of the buck-boost converter and the second signal is generated based on a signal proportional to an input voltage of the buck-boost converter, and the second timer is configured to determine a turn-on time of a low-side switch of the boost portion.

20 Claims, 16 Drawing Sheets

BUCK-BOOST CONVERTER AND CONTROL METHOD

PRIORITY CLAIM AND CROSS-REFERENCE

This application is a continuation of U.S. patent application Ser. No. 16/716,681, filed on Dec. 17, 2019, entitled "Buck-Boost Converter and Control Method", which application is hereby incorporated herein by reference.

TECHNICAL FIELD

The present invention relates to a control scheme of a power converter, and, in particular embodiments, to a power converter employing a constant on-time control scheme with a constant switching frequency under various operating conditions.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme or the constant off-time scheme can enable power converters to provide fast transient responses. A power converter employing the constant on-time control scheme may only comprise a feedback comparator and an on-timer. In operation, the feedback circuit of the power converter directly compares a feedback signal with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

As electronics devices move toward portable and mobile, many electronic devices rely on rechargeable batteries as their power sources. However, due to the characteristics of the rechargeable batteries, an output voltage of a battery pack could vary in a wide range between a fully charged state and a fully depleted state. In addition, as universal serial bus (USB) Type C has emerged as a new standard for charging and transferring data, the output voltage of a USB port is no longer fixed (e.g., 5 V). Instead, the output voltage may vary in a wide range from about 3.5 V to about 20 V. Meanwhile, downstream power converters connected to the new USB port (e.g., USB Type C) may still need a voltage substantially equal to 5 V. In response to the wide input voltage range, four-switch buck-boost converters have become widespread for USB Type C applications.

In a conventional four-switch buck-boost converter, all four switches are turned on and off once in each switching cycle. In addition, energy of the input power source is never transferred directly to an output of the four-switch buck-boost converter. Instead, energy of the input power source is stored in the inductor of the buck-boost converter first, and then transferred to the output of the converter. Thus, the efficiency of the conventional four-switch buck-boost converter is not high.

It would be desirable to provide an apparatus and/or a method for enabling the conventional four-switch buck-boost convert employing the constant on-time control scheme to operate in a buck mode, a boost mode and a buck-boost mode under different input voltages. Furthermore, it would be desirable to have a smooth transition between any two operating modes above in response to an input voltage variation.

SUMMARY

In particular embodiments, a control scheme may achieve fast transient responses and improve the performance of a four-switch buck-boost converter under a variety of operating conditions.

In accordance with an embodiment, an apparatus comprises a buck-boost converter comprising a buck portion and a boost portion connected in cascade, and a controller comprising a first timer and a second timer, wherein the first timer is configured to determine a turn-on time of a high-side switch of the buck portion, and wherein the first timer determines the turn-on time of the high-side switch of the buck portion based on a comparison between a first signal and a second signal, and wherein the first signal is proportional to an output voltage of the buck-boost converter and the second signal is generated based on a signal proportional to an input voltage of the buck-boost converter, and the second timer is configured to determine a turn-on time of a low-side switch of the boost portion.

In accordance with another embodiment, a method comprises generating a first ramp using a first current source having a current level proportional to an input voltage of a buck-boost converter, and a second ramp using a second current source having a current level proportional to an output voltage of the buck-boost converter, generating a first threshold voltage proportional to the output voltage of the buck-boost converter, and a second threshold voltage proportional to a difference between the output voltage and the input voltage of the buck-boost converter, terminating a gate drive signal of a first high-side switch of the buck-boost converter based upon comparing the first ramp with the first threshold voltage, and terminating a gate drive signal of a second low-side switch of the buck-boost converter based upon comparing the second ramp with the second threshold voltage.

In accordance with yet another embodiment, an apparatus comprises a buck-boost converter comprising a first high-side switch and a first low-side switch connected in series between two input terminals of the buck-boost converter, a second high-side switch and a second low-side switch connected in series between two output terminals of the buck-boost converter, and an inductor connected between a common node of the first high-side switch and the first low-side switch, and a common node of the second high-side switch and the second low-side switch, and a controller comprising a first timer and a second timer, wherein the first timer is configured to determine a turn-on time of the first high-side switch, and the second timer is configured to determine a turn-on time of the second low-side switch, and wherein the second timer determines the turn-on time of the second low-side switch based on a comparison between a first signal and a second signal, and wherein the first signal is proportional to a difference between an output voltage and an input voltage of the buck-boost converter, and the second signal is generated.

An advantage of a preferred embodiment of the present disclosure is improving the performance of a buck-boost power converter. More particularly, the control mechanism of the buck-boost converter is based on constant on-time (COnT) valley current mode (VCM) control. The constant on-time control eliminates the need of a fixed clock signal. Furthermore, with the constant on-time control, the transition from a pulse width modulation (PWM) mode to a pulse frequency modulation (PFM) mode can be realized automatically. Moreover, the slope compensation needed for peak current mode (PCM) control can be eliminated. Constant on-time control can greatly simplify the control circuit and the associated current consumption. With the valley current mode control, the output double pole formed by the inductor and the output capacitor can be reduced to a single pole response, thereby making the control loop compensation design much simpler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a constant on-time controlled power converter operating in a fixed switching frequency or an almost fixed switching frequency under various operating conditions. The invention may also be applied, however, to a variety of power converters. Hereinafter, various embodiments will be explained in detail with reference to the accompanying drawings.

Figure 1:
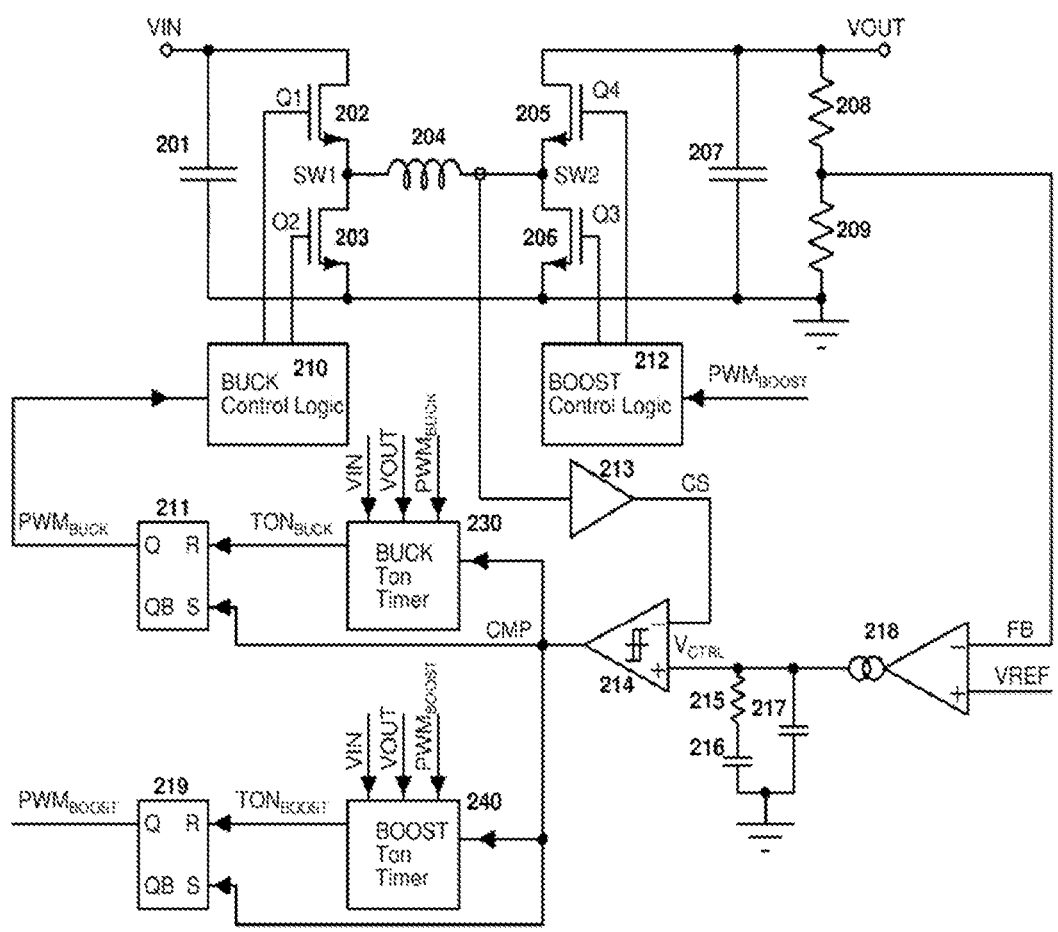
FIG. 1 illustrates a schematic diagram of a buck-boost converter and its associated constant on-time control circuit in accordance with various embodiments of the present disclosure.

FIG. 1 illustrates a schematic diagram of a buck-boost converter and its associated constant on-time control circuit in accordance with various embodiments of the present disclosure. The buck-boost converter comprises a first high-side switch Q1, a first low-side switch Q2, a second low-side switch Q3, a second high-side switch Q4 and an inductor 204 as shown in FIG. 1. The first high-side switch Q1 and the first low-side switch Q2 are connected in series between a positive terminal and a negative terminal of an input capacitor 201. The input capacitor 201 is connected to a power source VIN. The input capacitor 201 is employed to provide a steady voltage for the buck-boost converter. The second high-side switch Q4 and the second low-side switch Q3 are connected in series between a positive terminal and a negative terminal of an output capacitor 207. The inductor 204 is coupled between the common node of the first high-side switch Q1 and the first low-side switch Q2, and the common node of the second high-side switch Q4 and the second low-side switch Q3.

The buck-boost converter may be divided into two portions, namely a buck converter portion and a boost converter portion. The buck converter portion may comprise the first high-side switch Q1 and the first low-side switch Q2. The buck converter portion and the inductor 204 may function as a step-down converter. On the other hand, the boost converter portion may comprise the second high-side switch Q4 and second low-side switch Q3. The boost converter portion and the inductor 204 may function as a step-up converter. The buck converter portion, the inductor 204 and the boost converter portion are connected in cascade between the input capacitor 201 and the output capacitor 207.

Both the buck converter portion and the boost converter portion of the buck-boost converter are controlled by a constant on-time control circuit. As shown in FIG. 1, the constant on-time control circuit comprises an amplifier 218, a valley current comparator 214, a buck on-time timer 230, a boost on-time timer 240, a first latch 211, a second latch 219, a buck control logic unit 210 and a boost control logic unit 212.

As shown in FIG. 1, the constant on-time control circuit may detect the output voltage VOUT and the current flowing through the inductor 204, and generate a plurality of gate drive signals for driving switches Q1, Q2, Q3 and Q4 accordingly.

In some embodiments, the amplifier 218 is a voltage error amplifier. As shown in FIG. 1, the inverting input (FB) of the amplifier 218 is employed to detect the output voltage VOUT through a voltage divider formed by resistors 208 and 209. The non-inverting input of the amplifier 218 is connected to a predetermined reference VREF. The output of the amplifier 218 is connected to a non-inverting input of the valley current comparator 214. A compensation network is connected between the output of the amplifier 218 and ground. The compensation network comprises resistor 215, capacitor 216 and capacitor 217. The resistor 215 and the capacitor 216 are connected in series and further connected in parallel with the capacitor 217. The compensation network helps to stabilize the control loop and provide sufficient phase margin, thereby improving the transient response performance of the buck-boost converter.

The inverting input of the valley current comparator 214 is configured to receive the detected current signal (CS). As shown in FIG. 1, the current flowing through the inductor 204 is detected by a suitable current sensing device such as a dc resistance (DCR) current sensing apparatus. The sensed current signal is fed into the inverting input of the valley current comparator 214 through a current sensing amplifier 213. The current sensing amplifier 213 is employed to provide a suitable current sensing gain.

The first latch 211 is employed to generate gate drive signals for switches Q1 and Q2, respectively. As shown in FIG. 1, the reset input of the first latch 211 is configured to receive the output signal of the buck on-time timer 230. The set input of the first latch 211 is configured to receive the output signal of the valley current comparator 214. The output of the first latch 211 is a PWM signal for controlling the buck converter portion of the buck-boost converter. As shown in FIG. 1, the output of the first latch 211 is applied to the gates of the switches Q1 and Q2 respectively through the buck control logic unit 210. The buck control logic unit 210 is employed to generate a high-side gate drive signal and a low-side gate drive signal based upon the PWM signal generated by the first latch 211. Furthermore, the buck control logic unit 210 adds a suitable delay between the high-side gate drive signal and the low-side gate drive signal. The detailed schematic diagram of the buck on-time timer 230 will be described below with respect to FIG. 2.

The second latch 219 is employed to generate gate drive signals for switches Q3 and Q4, respectively. As shown in FIG. 1, the reset input of the second latch 219 is configured to receive the output signal of the boost on-time timer 240. The set input of the second latch 219 is configured to receive the output signal of the valley current comparator 214. The output of the second latch 219 is a PWM signal for controlling the boost converter portion of the buck-boost converter. As shown in FIG. 1, the output of the second latch 219 is applied to the gates of the switches Q3 and Q4 respectively through the boost control logic unit 212. The boost control logic unit 212 is employed to generate a high-side gate drive signal and a low-side gate drive signal based upon the PWM signal generated by the second latch 219. Furthermore, the boost control logic unit 212 adds a suitable delay between the high-side gate drive signal and the low-side gate drive signal. The detailed schematic diagram of the boost on-time timer 240 will be described below with respect to FIG. 2.

It should be noted that while the example throughout the description is based upon a buck-boost converter and a constant on-time control circuit configured to generate gate drive signal for the buck-boost converter (e.g., buck-boost converter shown in FIG. 1), the buck-boost converter as well as the constant on-time control circuit shown in FIG. 1 may have many variations, alternatives, and modifications. For example, the constant on-time control circuit may detect other necessary signals such as the input voltage, the input current and/or the output current of the buck-boost converter. Furthermore, there may be one dedicated driver or multiple dedicated drivers coupled between the constant on-time control circuit and the switches Q1, Q2, Q3 and Q4. In sum, the buck-boost converter and the constant on-time control circuit illustrated herein is limited solely for the purpose of clearly illustrating the inventive aspects of the various embodiments. The present disclosure is not limited to any particular power topology and system configurations.

The switches (e.g., the first high-side switch Q1) shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates four switches Q1, Q2, Q3, and Q4, various embodiments of the present disclosure may include other variations, modifications and alternatives. For example, the low-side switch Q2 may be replaced by a freewheeling diode and/or the like. The high-side switch Q4 may be replaced by a rectifier diode and/or the like.

Based upon different design needs and applications, the buck-boost converter may be configured to operate in three different operating modes, namely a buck operating mode, a boost operating mode and a buck-boost operating mode. The detailed operating principles of these three operating modes will be described below with respect to FIGS. 3-5, respectively.

In some embodiments, the buck-boost converter is configured to operate in a buck operating mode. In the buck operating mode, switches Q1 and Q2 are controlled by complementary gate drive signals with appropriate switching dead times in the same manner as in a convention buck converter. The switch Q3 is always off and the switch Q4 is always on. The detailed operating principles of the buck operating mode will be described below with respect to FIG. 3.

In some embodiments, the buck-boost converter is configured to operate in a buck-boost operating mode. In the buck-boost operating mode, switches Q1 and Q2 are controlled by complementary gate drive signals with appropriate switching dead times in the same manner as in a convention buck converter. Switches Q3 and Q4 are controlled by complementary gate drive signals with appropriate switching dead times in the same manner as in a convention boost converter. The detailed operating principles of the second control mechanism will be described below with respect to FIG. 4.

In some embodiments, the buck-boost converter is configured to operate in a boost operating mode. In the boost operating mode, switches Q3 and Q4 are controlled by complementary gate drive signals with appropriate switching dead times in the same manner as in a convention boost converter. Switch Q2 is always off and switch Q1 is always on. The detailed operating principles of the boost operating mode will be described below with respect to FIG. 5.

Figure 2:
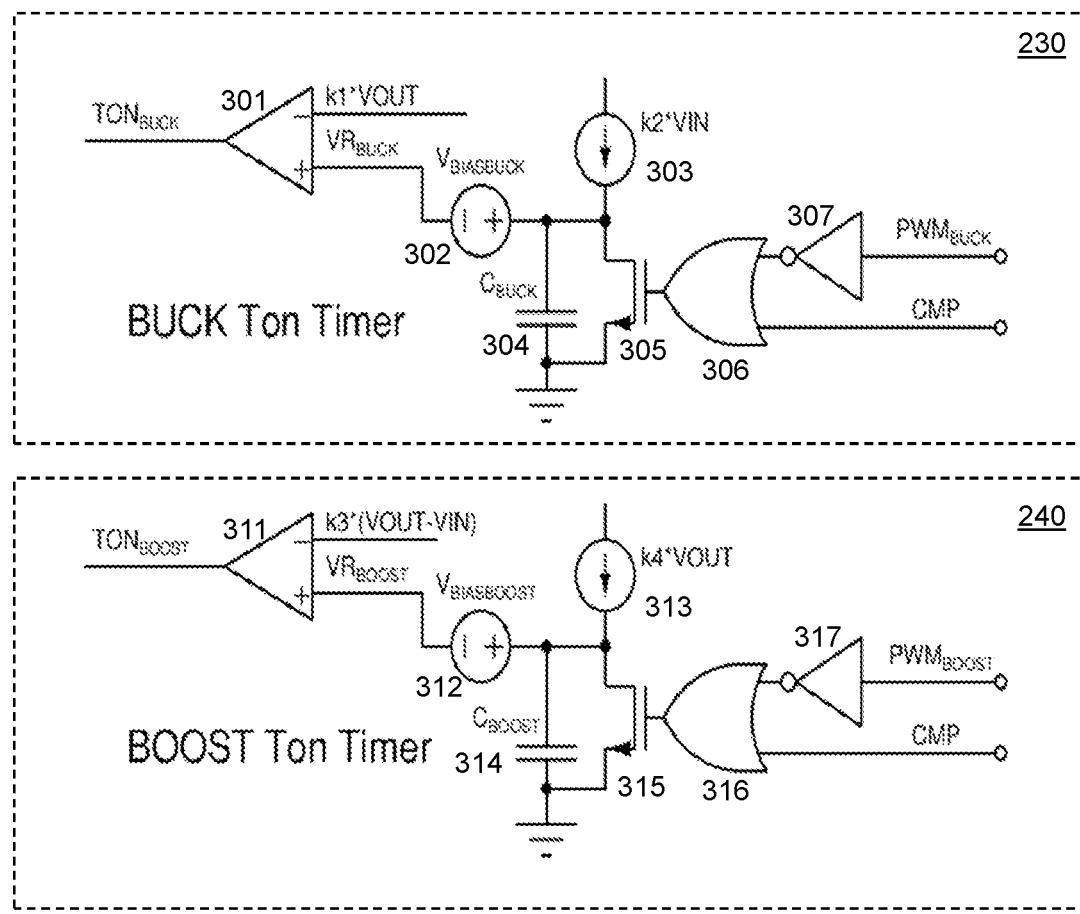
FIG. 2 illustrates schematic diagrams of the buck on-time timer and the boost on-time timer in accordance with various embodiments of the present disclosure.

FIG. 2 illustrates schematic diagrams of the buck on-time timer and the boost on-time timer in accordance with various embodiments of the present disclosure. In some embodiments, the buck on-time timer 230 is configured to calculate the on time of the buck converter portion, and the boost on-time timer 240 is configured to calculate the on time of the boost converter portion.

As shown in FIG. 2, the buck on-time timer 230 includes a current source 303, a capacitor 304, a switch 305, a comparator 301, an OR gate 306, an inverter 307 and a buck bias voltage source 302. As shown in FIG. 2, the current level of the current source 303 is proportional to the input voltage VIN. In some embodiments, k2 is a predetermined coefficient. The current source 303 is used to charge the capacitor 304. The voltage across the capacitor 304 is a voltage ramp. Throughout the description, the capacitor 304 may be alternatively referred to as a ramp capacitor.

The buck bias voltage source 302 and the capacitor 304 are connected in series. As shown in FIG. 2, the negative terminal of the buck bias voltage source 302 is connected to a first terminal of the capacitor 304. A second terminal of the capacitor 304 is connected to ground. The sum of the voltage across the capacitor 304 and the buck bias voltage source 302 is fed into a non-inverting input of the comparator 301. The inverting input of the comparator 301 is connected to a threshold voltage, which is proportional to the output voltage. In some embodiments, k1 is a predetermined coefficient. The gate of the switch 305 is controlled by the output signal of the OR gate 306. As shown in FIG. 2, the OR gate 306 is configured to receive the PWM signal generated by the first latch 211 through the inverter 307 and the CMP signal generated by the valley current comparator 214. The combination of the PWM and CMP signals determines the reset of the capacitor 304 as shown in FIG. 2.

As shown in FIG. 2, the sum of the voltage across the capacitor 304 and the buck bias voltage source 302 is compared with the threshold voltage at the comparator 301. After the sum of the voltage across the capacitor 304 and the buck bias voltage source 302 reaches the threshold voltage, the output of the comparator 301 generates a termination signal of the on-time of the buck converter portion (a termination signal for turning off the switch Q1).

The turn-on time of the high-side switch Q1 or the turn-off time of the low-side switch Q2 is determined by the comparison result between the sum of the voltage across the capacitor 304 and the buck bias voltage source 302, and the threshold voltage. The on-time of the high-side switch Q1 (or the turn-off time of the low-side switch Q2) satisfies the following equation:

$$T_{ONBUCK} = C_{BUCK} \cdot \frac{k1 \cdot VOUT + V_{BIASBUCK}}{k2 \cdot VIN} \quad (1)$$

where $C_{BUCK}$ is the capacitance of capacitor 304, and k1 and k2 are predetermined parameters. $V_{BIASBUCK}$ is the voltage of the buck bias voltage source 302.

The boost on-time timer 240 includes a current source 313, a capacitor 314, a switch 315, a comparator 311, an OR gate 316, an inverter 317 and a boost bias voltage source 312. As shown in FIG. 2, the current level of the current source 313 is proportional to the output voltage VOUT. The current source 313 is used to charge the capacitor 314. The voltage across the capacitor 314 is a voltage ramp. Throughout the description, the capacitor 314 may be alternatively referred to as a ramp capacitor.

The sum of the voltage across the capacitor 314 and the boost bias voltage source 312 is fed into a non-inverting input of the comparator 311. As shown in FIG. 2, the positive terminal of the boost bias voltage source 312 is connected to a first terminal of the capacitor 314. A second terminal of the capacitor 314 is connected to ground. The inverting input of the comparator 311 is connected to a threshold voltage, which is proportional to a voltage difference between the output voltage VOUT and the input voltage VIN. The gate of the switch 315 is controlled by the output signal of the OR gate 316. As shown in FIG. 2, the OR gate 316 is configured to receive the PWM signal generated by the second latch 219 through an inverter 317 and the CMP signal generated by the valley current comparator 214. The combination of the PWM and CMP signals determines the reset of the capacitor 314.

The sum of the voltage across the capacitor 314 and the boost bias voltage source 312 is compared with the threshold voltage at the comparator 311. After the sum of the voltage across the capacitor 314 and the boost bias voltage source 312 reaches the threshold voltage, the output of the comparator 311 generates a termination signal of the on-time of the boost converter portion.

The turn-on time of the low-side switch Q3 or the turn-off time of the high-side switch Q4 is determined by the comparison result between the sum of the voltage across the capacitor 314 and the boost bias voltage source 312, and the threshold voltage. The on-time of the low-side switch Q3 (or the turn-off time of the high-side switch Q4) satisfies the following equation:

$$T_{ONBOOST} = C_{BOOST} \cdot \frac{k3 \cdot (VOUT - VIN) + V_{BIASBOOST}}{k4 \cdot VOUT} \quad (2)$$

where $C_{BOOST}$ is the capacitance of capacitor 314, and k3 and k4 are predetermined parameters. $V_{BIASBOOST}$ is the voltage of the boost bias voltage source 312.

In the equations above, k1 and k3 are voltage scaling factors, and k2 and k4 are voltage to current scaling factors. By choosing different scaling factors, $T_{ONBUCK}/T_{ONBOOST}$ and corresponding switching frequency can be adjusted accordingly.

In some embodiments, the buck bias voltage source 302 and the boost bias voltage source 312 are employed to achieve automatic transitions among different operating modes, namely the buck operating mode, the buck-boost operating mode and the boost operating mode.

Figure 3:
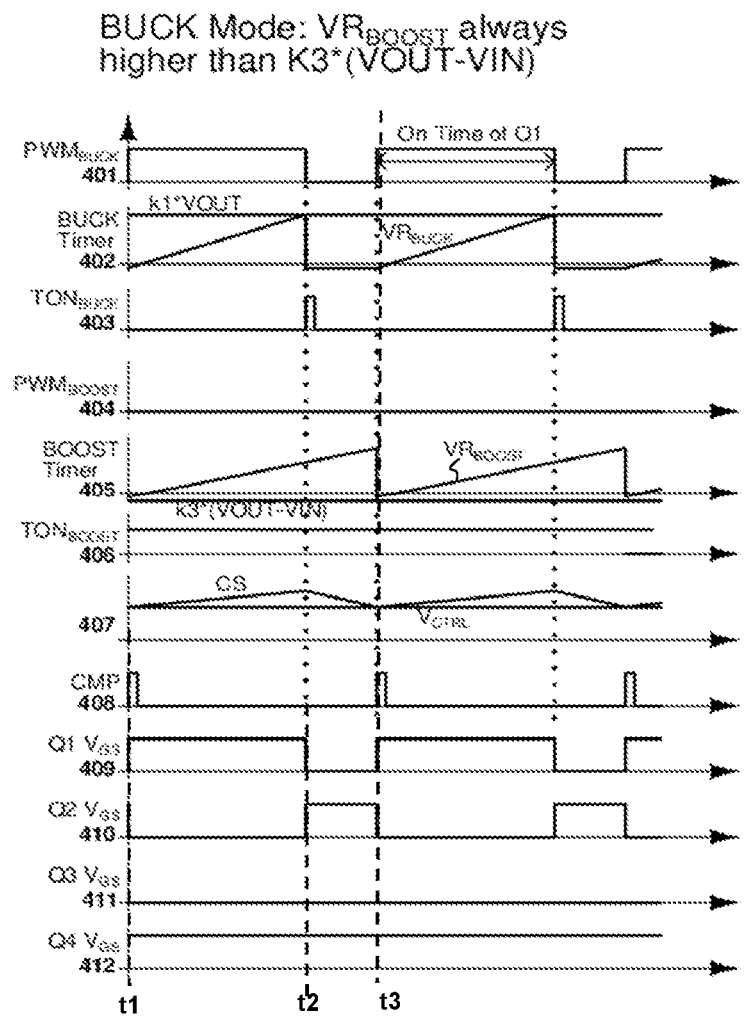
FIG. 3 illustrates timing diagrams associated with the buck operating mode of the buck-boost converter shown in FIG. 1 in accordance with various embodiments of the present disclosure.

FIG. 3 illustrates timing diagrams associated with the buck operating mode of the buck-boost converter shown in FIG. 1 in accordance with various embodiments of the present disclosure. The horizontal axis of FIG. 3 represents intervals of time. There are twelve rows. The first row 401 represents the PWM signal generated by the first latch 211. The second row 402 represents the threshold voltage and the ramp fed into the comparator 301. The third row 403 represents the output voltage of the comparator 301. The fourth row 404 represents the PWM signal generated by the second latch 219. The fifth row 405 represents the threshold voltage and the ramp fed into the comparator 311. The sixth row 406 represents the output voltage of the comparator 311. The seventh row 407 represents the detected current signal and the error amplifier voltage fed into the valley current comparator 214. The eighth row 408 represents the output voltage of the valley current comparator 214. The ninth row 409 represents the gate drive signal of the switch Q1. The tenth row 410 represents the gate drive signal of the switch Q2. The eleventh row 411 represents the gate drive signal of the switch Q3. The twelfth row 412 represents the gate drive signal of the switch Q4.

In operation, when the input voltage VIN of the buck-boost converter is much higher than the output voltage VOUT of the buck-boost converter, the off-time of the boost converter portion is much longer than a switching period of the buck-boost converter. Referring to FIG. 2, in the buck operating mode, $VR_{BOOST}$ is always higher than k3·(VOUT−VIN). As a result, the signal $T_{ONBOOST}$ is at a logic high state, which generates a logic low state at $PWM_{BOOST}$. In response to a logic low state at $PWM_{BOOST}$, the high-side switch Q4 is always on and the low-side switch Q3 is always off. The on-time of the buck converter portion is determined by the buck on-time timer 230. The buck-boost converter operates in the buck operating mode.

Referring back to FIG. 1, in the buck operating mode, the current sensing amplifier 213 is configured to detect the current of Q1 (the current flowing through inductor 204). According to the valley current mode control, Q1 is turned on when the output of the current sensing amplifier 213 reaches the control voltage $V_{CTRL}$ of the comparator 214. After Q1 has been turned on, the buck on-time timer 230 starts to count. Once the buck on-time timer 230 triggers, Q1 is turned off and Q2 is turned on. Once the output of the current sensing amplifier 213 reaches the control voltage $V_{CTRL}$ of the comparator 214, Q2 is turned off and Q1 is turned on again to start another cycle.

FIG. 3 shows a timing diagram illustrating the operation principle of the buck operating mode. At the time instant t1, the output of the current sensing amplifier 213 (CS in FIG. 3) drops and reaches the control voltage $V_{CTRL}$ of the comparator 214. Referring back to FIG. 1, at the time instant t1, the output of the comparator 214 generates a logic level "1" and sends this logic level "1" to the set input of the first latch 211. According to the operating principle of the R-S latch, the output of the comparator 214 determines the turn-on edge of the gate drive signal of Q1.

As shown in FIG. 3, at the time instant t1, Q2 has been turned off and Q1 has been turned on. It should be noted that there is a suitable delay between the turn-on of Q1 and the turn-off of Q2. As a result of the turn-on of Q1, the sense current CS increases in a linear manner from the time instant t1 to the time instant t2. From the time instant t1 to the time instant t2, the control signal $PWM_{BUCK}$ is of a logic high state, which turns off the switch 305 of the ramp generation circuit shown in FIG. 2. As a result, the ramp capacitor 304 is charged, and the voltage across the capacitor 304 increases in a linear manner from the time instant t1 to the time instant t2. During the buck operating mode, the boost on-time timer is never triggered. The boost ramp is reset by the output of the comparator 214 (CMP in FIG. 3).

At the time instant t2, the ramp voltage $VR_{BUCK}$ reaches the threshold voltage k1·VOUT. The output of the comparator 301 generates a logic level "1" and sends this logic level "1" to the reset input of the first latch 211. According to the operating principle of the R-S latch, the output of the comparator 301 determines the turn-off edge of the gate drive signal of Q1.

As shown in FIG. 3, at the time instant t2, the logic level "1" and the logic level "0" are applied to the gates of Q2 and Q1 respectively through the buck control logic unit 210. As a result of the turn-on of Q2 and the turn-off of Q1, the detected current signal CS decreases in a linear manner from the time instant t2 to the time instant t3, and the ramp capacitor 304 is discharged.

At the time instant t3, the output of the current sensing amplifier 213 (CS in FIG. 3) reaches the control voltage $V_{CTRL}$ of the comparator 214 again. The buck-boost converter enters into a new switching period.

Figure 4:
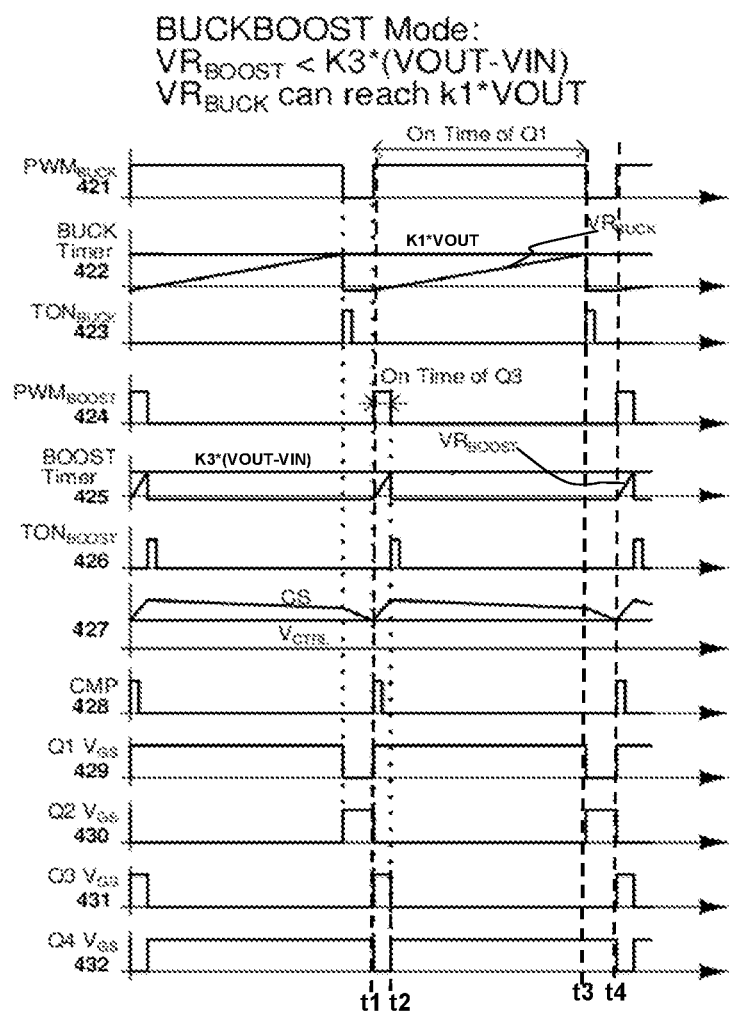
FIG. 4 illustrates timing diagrams associated with the buck-boost operating mode of the buck-boost converter shown in FIG. 1 in accordance with various embodiments of the present disclosure.

FIG. 4 illustrates timing diagrams associated with the buck-boost operating mode of the buck-boost converter shown in FIG. 1 in accordance with various embodiments of the present disclosure. The horizontal axis of FIG. 4 represents intervals of time. There are twelve rows. The first row 421 represents the PWM signal generated by the first latch 211. The second row 422 represents the threshold voltage and the ramp fed into the comparator 301. The third row 423 represents the output voltage of the comparator 301. The fourth row 424 represents the PWM signal generated by the second latch 219. The fifth row 425 represents the threshold voltage and the ramp fed into the comparator 311. The sixth row 426 represents the output voltage of the comparator 311. The seventh row 427 represents the detected current signal and the error amplifier voltage fed into the valley current comparator 214. The eighth row 428 represents the output voltage of the valley current comparator 214. The ninth row 429 represents the gate drive signal of the switch Q1. The tenth row 430 represents the gate drive signal of the switch Q2. The eleventh row 431 represents the gate drive signal of the switch Q3. The twelfth row 432 represents the gate drive signal of the switch Q4.

In operation, when the input voltage VIN drops to a level approximately equal to the output voltage VOUT, the off-time of the boost converter portion is reduced due to the offset voltage $V_{BIASBOOST}$ even when the input voltage VIN is still higher than the output voltage VOUT. When the on-time of the boost converter portion ($T_{ONBOOST}$) increases and reaches a threshold level, Q4 starts to turn off and Q3 turns on. As a result of turning off Q4 and turning on Q3, the buck-boost converter operates in the buck-boost operating mode.

The timing diagram of FIG. 4 shows the operating principle of the buck-boost operating mode. Prior to the time instant t1, Q2 and Q4 are initially in an ON state. The current flowing through the inductor (CS in FIG. 4) decreases in a linear manner. At the time instant t1, the sensed current CS reaches the control voltage $V_{CTRL}$, both Q2 and Q4 are turned off as shown in FIG. 4. After a suitable delay, Q1 and Q3 are turned on. At the time instant t1, both the buck on-time timer 230 (shown in FIG. 2) and the boost on-time timer 240 (shown in FIG. 2) start to count. In some embodiments, the on-time of the buck converter portion ($T_{ONBUCK}$) is much longer than the on-time of the boost converter portion ($T_{ONBOOST}$).

As shown in FIG. 4, the boost on-time timer 240 is triggered at the time instant t2. As a result of triggering the boost on-time timer 240, Q3 is turned off and Q4 is turned on at the time instant t2. At the time instant t3, the buck on-time timer 230 is triggered. As a result of triggering the buck on-time timer 230, Q1 is turned off and Q2 is turned on at the time instant t3. From the time instant t3 to the time instant t4, the current flowing through the inductor (CS in FIG. 4) decreases in a linear manner. At the time instant t4, the sensed current signal CS reaches the control voltage $V_{CTRL}$, both Q2 and Q4 are turned off as shown in FIG. 4. After a suitable delay, Q2 and Q3 are turned on. Another switch cycle starts.

Figure 5:
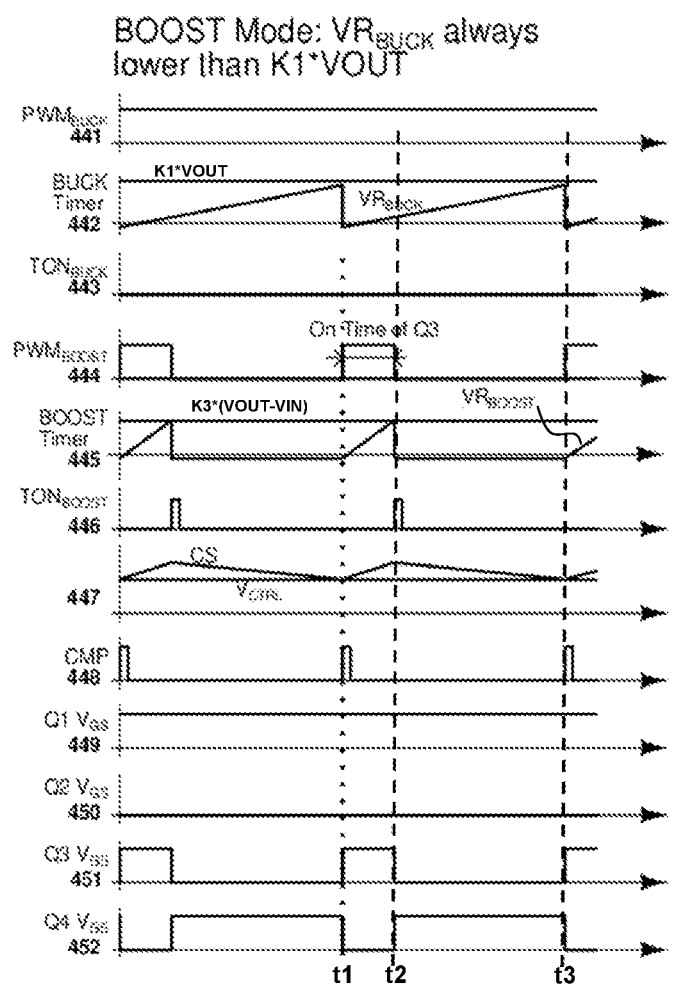
FIG. 5 illustrates timing diagrams associated with the boost operating mode of the buck-boost converter shown in FIG. 1 in accordance with various embodiments of the present disclosure.

FIG. 5 illustrates timing diagrams associated with the boost operating mode of the buck-boost converter shown in FIG. 1 in accordance with various embodiments of the present disclosure. The horizontal axis of FIG. 5 represents intervals of time. There are twelve rows. The first row 441 represents the PWM signal generated by the first latch 211. The second row 442 represents the threshold voltage and the ramp fed into the comparator 301. The third row 443 represents the output voltage of the comparator 301. The fourth row 444 represents the PWM signal generated by the second latch 219. The fifth row 445 represents the threshold voltage and the ramp fed into the comparator 311. The sixth row 446 represents the output voltage of the comparator 311. The seventh row 447 represents the detected current signal and the error amplifier voltage fed into the valley current comparator 214. The eighth row 448 represents the output voltage of the valley current comparator 214. The ninth row 449 represents the gate drive signal of the switch Q1. The tenth row 450 represents the gate drive signal of the switch Q2. The eleventh row 451 represents the gate drive signal of the switch Q3. The twelfth row 452 represents the gate drive signal of the switch Q4.

In operation, the input voltage VIN drops to a predetermined level below the output voltage VOUT. The predetermined level satisfies the following condition: k1·VOUT is always greater than $VR_{BUCK}$. After the input voltage VIN reaches this predetermined level, $TON_{BUCK}$ is always low as shown in FIG. 5. As a result, Q1 is always on and Q2 is always off. The buck-boost converter operates in a boost operating mode.

The timing diagram of FIG. 5 shows the operating principle of the boost operating mode. In the boost operating mode, the output of the buck on-time timer 230 is always in a logic low state. Since the output of the buck on-time timer 230 is always in the logic low state, Q1 is always on and Q2 is always off.

At the time instant t1, the output of the current sensing amplifier 213 (CS in FIG. 5) reaches the control voltage $V_{CTRL}$ of the comparator 214. As discussed above with respect to FIG. 2, at the time instant t1, the output (CMP in FIG. 5) of the comparator 214 generates a logic level "1" and sends this logic level "1" to the set input of the second latch 219 (shown in FIG. 1). According to the operating principle of the R-S latch, the output of the comparator 214 determines the turn-on edge of the gate drive signal of Q3.

As shown in FIG. 5, at the time instant t1, Q4 has been turned off. After a suitable delay, Q3 is turned on. As a result of the turn-on of Q3, the sense current CS increases in a linear manner from the time instant t1 to the time instant t2. From the time instant t1 to the time instant t2, the control signal $PWM_{BOOST}$ is of a logic high state. After passing an inverter, the control signal $PWM_{BOOST}$ turns off the switch 315 of the ramp generation circuit shown in FIG. 2. As a result, the ramp capacitor 314 is charged, and the voltage across the capacitor 314 increases in a linear manner from the time instant t1 to the time instant t2.

At the time instant t2, the ramp voltage $VR_{BOOST}$ reaches the threshold voltage. The output ($TON_{BOOST}$) of the comparator 311 generates a logic level "1" and sends this logic level "1" to the reset input of the second latch 219. According to the operating principle of the R-S latch, the output ($TON_{BOOST}$) of the comparator 311 determines the turn-off edge of the gate drive signal of Q3.

As shown in FIG. 5, the logic level "0" and the logic level "1" are applied to the gates of Q3 and Q4 respectively through the boost control logic unit 212. As a result of the turn-off of Q3 and the turn-on of Q4, the sense current CS decreases in a linear manner from the time instant t2 to the time instant t3. The ramp capacitor 314 is discharged at the time instant t2. At the time instant t3, the output of the current sensing amplifier 213 (CS in FIG. 3) reaches the control voltage $V_{CTRL}$ of the comparator 214 again. The buck-boost converter enters into a new switching period.

Figure 6:
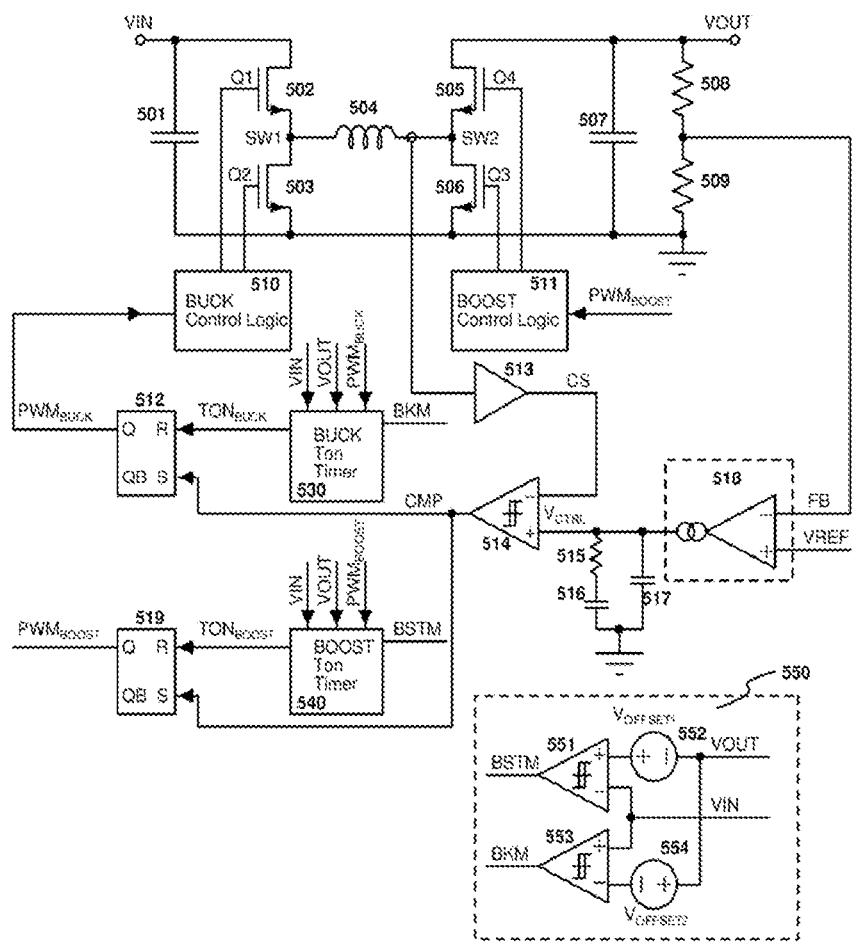
FIG. 6 illustrates a schematic diagram of another buck-boost converter and its associated constant on-time control circuit in accordance with various embodiments of the present disclosure.

FIG. 6 illustrates a schematic diagram of another buck-boost converter and its associated constant on-time control circuit in accordance with various embodiments of the present disclosure. The buck-boost converter shown in FIG. 6 is similar to that shown in FIG. 1 except that the operating mode transition is determined by a control unit 550. In particular, the control unit 550 determines which operating mode (buck, buck-boost or boost) the buck-boost converter operates in depending on the relationship between the input voltage VIN and the output voltage VOUT.

The control unit 550 comprises a first comparator 551 and a second comparator 553 as shown in FIG. 6. The first comparator 551 has a non-inverting input connected to a sum of the output voltage VOUT and a first offset voltage VOFFSET1. The first comparator 551 has an inverting input connected the input voltage VIN. The output of the first comparator 551 is applied to the control circuit of the boost converter portion of the buck-boost converter based upon the relationship between the input voltage VIN and the output voltage VOUT.

The second comparator 553 has a non-inverting input connected to the input voltage VIN. The second comparator 553 has an inverting input connected to a voltage level equal to the output voltage VOUT minus a second offset voltage VOFFSET2. The output of the second comparator 553 is applied to the control circuit of the buck converter portion of the buck-boost converter based upon the relationship between the input voltage VIN and the output voltage VOUT.

It should be noted that both the first offset voltage VOFFSET1 and the second offset voltage VOFFSET2 are predetermined. Based on different applications and design needs, the values of the first offset voltage VOFFSET1 and the second offset voltage VOFFSET2 may vary accordingly.

Figure 7:
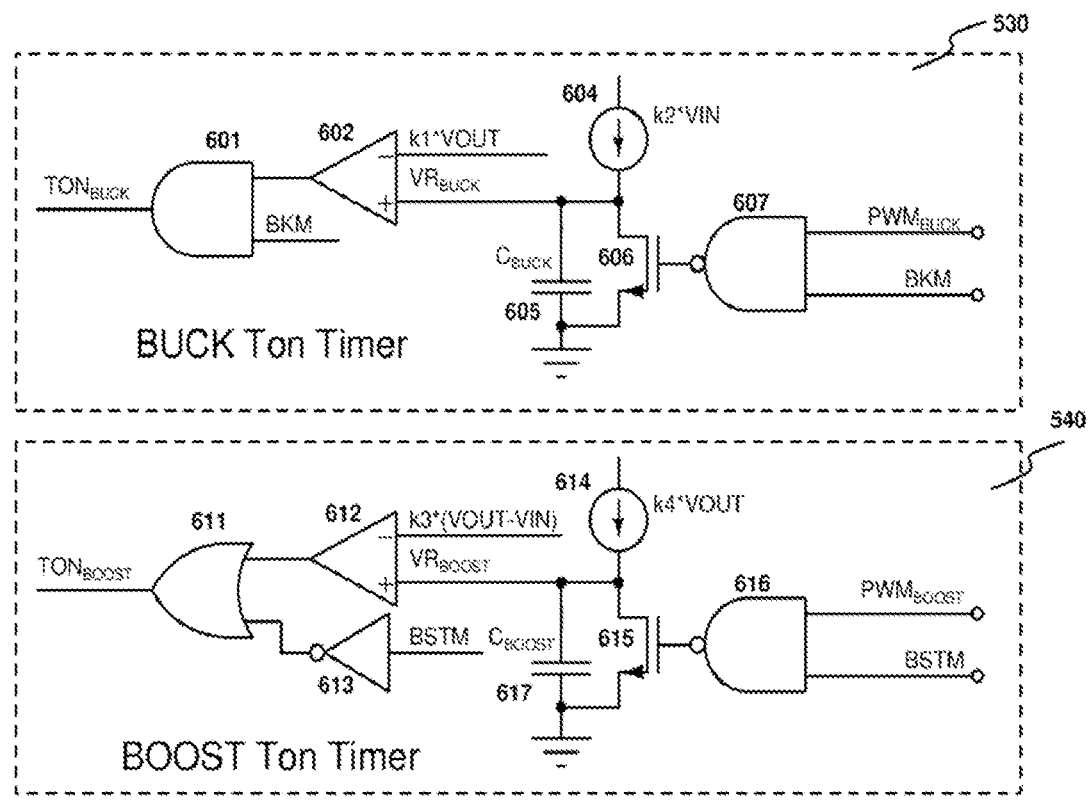
FIG. 7 illustrates schematic diagrams of the buck on-time timer and the boost on-time timer shown in FIG. 6 in accordance with various embodiments of the present disclosure.

FIG. 7 illustrates schematic diagrams of the buck on-time timer and the boost on-time timer shown in FIG. 6 in accordance with various embodiments of the present disclosure. The buck on-time timer 530 and the boost on-time timer 540 are similar to those shown in FIG. 2 except that the outputs of the comparators 551 and 553 shown in FIG. 6 are used to determine an operating mode of the buck-boost converter.

As shown in FIG. 7, an AND gate 601 is configured to receive the BKM signal generated by the second comparator 553. The BKM signal is employed to enable the buck converter portion of the buck-boost converter. The BKM signal is also used to reset the ramp capacitor 605. As shown in FIG. 7, the $PWM_{BUCK}$ signal and the BKM signal are fed into an NAND gate 607. The output of the NAND gate 607 is used to reset the ramp capacitor 605.

As shown in FIG. 7, an OR gate 611 is configured to receive the BSTM signal generated by the first comparator 551. The BSTM signal is employed to enable the boost converter portion of the buck-boost converter. The BSTM signal is also used to reset the ramp capacitor 617. As shown in FIG. 7, the $PWM_{BOOST}$ signal and the BSTM signal are fed into an NAND gate 616. The output of the NAND gate 616 is used to reset the ramp capacitor 617.

Figure 8:
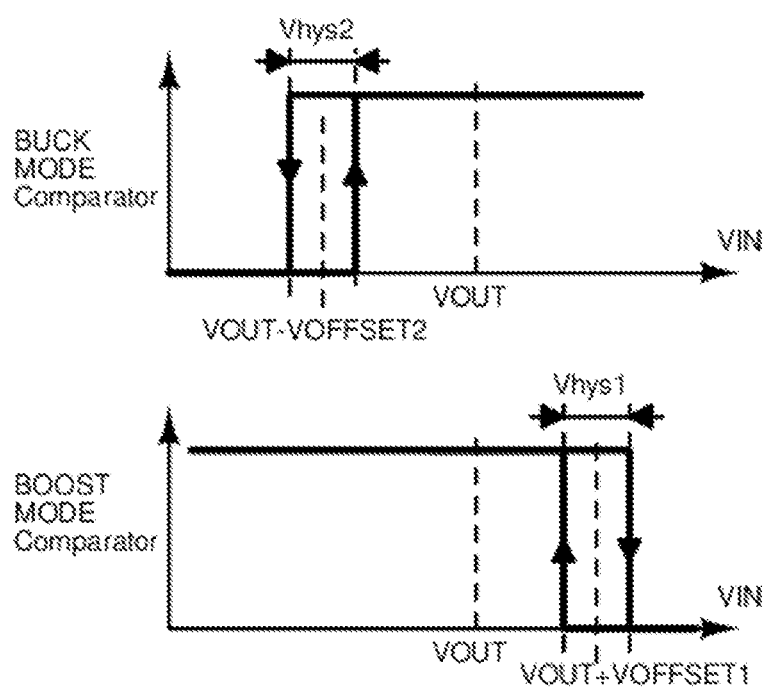
FIG. 8 illustrates the operating principles of the comparators shown in FIG. 6 in accordance with various embodiments of the present disclosure.

FIG. 8 illustrates the operating principles of the comparators shown in FIG. 6 in accordance with various embodiments of the present disclosure. In FIG. 8, when the input voltage VIN is higher than VOUT+VOFFSET1, the buck-boost converter disenables the boost operating mode and operates in the buck operating mode. Referring back to FIG. 6, the control circuit generates a PWM signal (e.g., $PWM_{BUCK}$) and applies the PWM signal to Q1 and Q2. In this operating mode, Q3 is always off and Q4 is always on.

In operation, when the input voltage VIN is lower than VOUT−VOFFSET2, the buck-boost converter disenables the buck operating mode and operates in the boost operating mode. Referring back to FIG. 6, the control circuit generates a PWM signal (e.g., $PWM_{BOOST}$) and applies the PWM signal to Q3 and Q4. In this operating mode, Q2 is always off and Q1 is always on.

In operation, when the input voltage VIN is between VOUT−VOFFSET2 and VOUT+VOFFSET1, the buck-boost converter operates in the buck-boost operating mode. The control circuit enables switching all four switches during each switching cycle.

Figure 9:
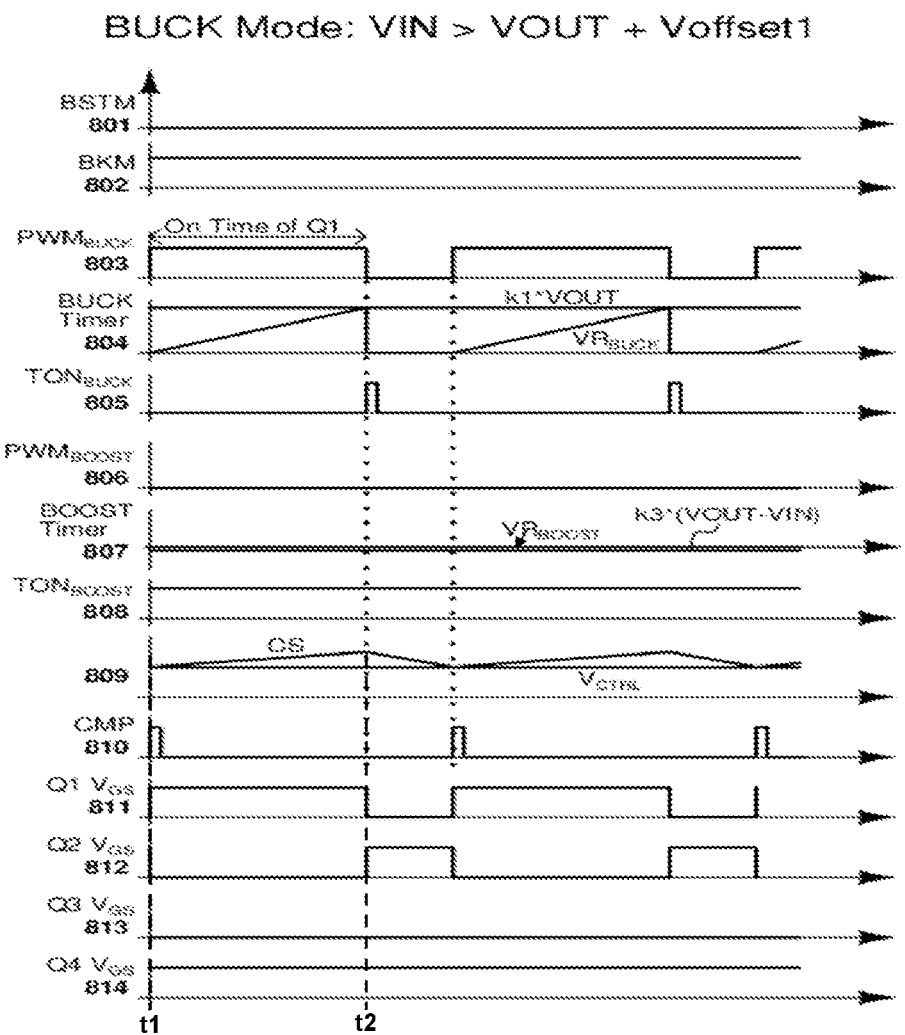
FIG. 9 illustrates timing diagrams associated with the buck operating mode of the buck-boost converter shown in FIG. 6 in accordance with various embodiments of the present disclosure.

FIG. 9 illustrates timing diagrams associated with the buck operating mode of the buck-boost converter shown in FIG. 6 in accordance with various embodiments of the present disclosure. The horizontal axis of FIG. 9 represents intervals of time. There are fourteen rows. The first row 801 represents the BSTM signal generated by the comparator 551. The second row 802 represents the BKM signal generated by the comparator 553. The third row 803 represents the PWM signal generated by the first latch 512. The fourth row 804 represents the threshold voltage and the ramp fed into the comparator 602. The fifth row 805 represents the output voltage of the AND gate 601. The sixth row 806 represents the PWM signal generated by the second latch 519. The seventh row 807 represents the threshold voltage and the ramp fed into the comparator 612. The eighth row 808 represents the output voltage of the OR gate 611. The ninth row 809 represents the detected current signal and the error amplifier voltage fed into the valley current comparator 514. The tenth row 810 represents the output voltage of the valley current comparator 514. The eleventh row 811 represents the gate drive signal of the switch Q1. The twelfth row 812 represents the gate drive signal of the switch Q2. The thirteenth row 813 represents the gate drive signal of the switch Q3. The fourteenth row 814 represents the gate drive signal of the switch Q4.

The timing diagram shown in FIG. 9 is similar to that shown in FIG. 3 except that the BSTM signal and the BKM signal are employed to determine the operating mode of the buck-boost converter. In the buck operating mode, the BSTM signal is of a logic low state as shown in FIG. 9. The BKM signal is of a logic high state as shown in FIG. 9. The logic low state of the BSTM signal is used to disable the boost operating mode. As shown in FIG. 9, the $PWM_{BOOST}$ signal is of a logic low state. Such a logic low state keeps Q3 always off and Q4 always on. The logic high state of the BKM signal is fed into the OR gate 601 through an inverter 603. The inverted BKM signal is a logic low signal, which has no impact on the operation of the buck converter portion.

Figure 10:
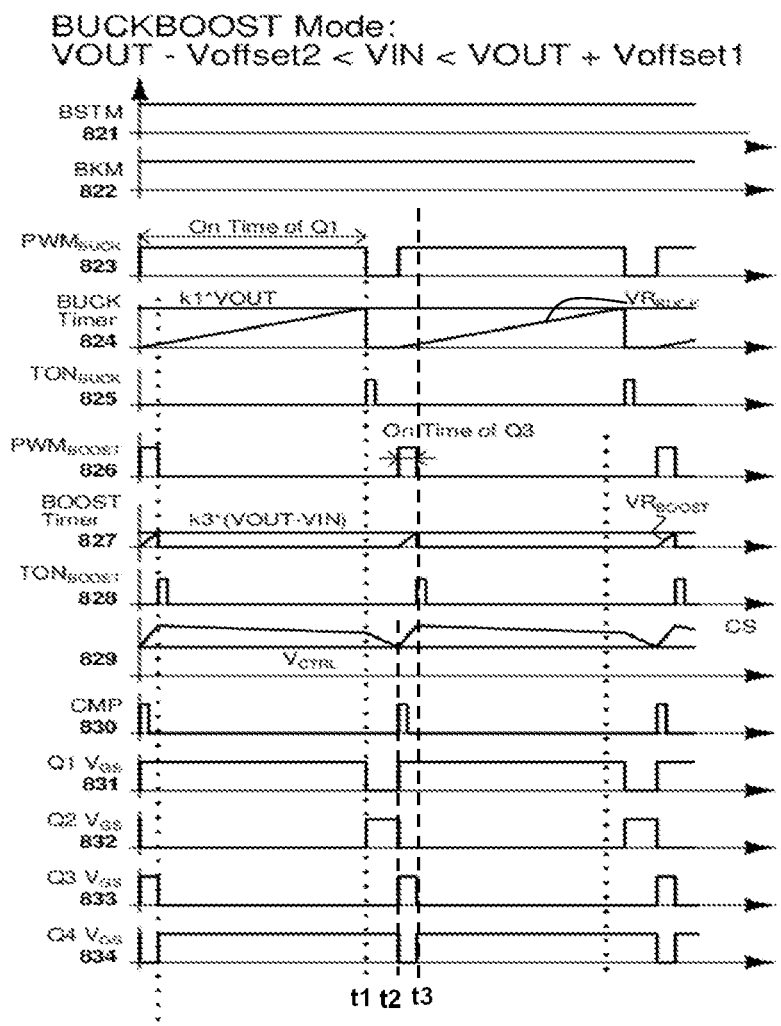
FIG. 10 illustrates timing diagrams associated with the buck-boost operating mode of the buck-boost converter shown in FIG. 6 in accordance with various embodiments of the present disclosure.

FIG. 10 illustrates timing diagrams associated with the buck-boost operating mode of the buck-boost converter shown in FIG. 6 in accordance with various embodiments of the present disclosure. The horizontal axis of FIG. 10 represents intervals of time. There are fourteen rows. The first row 821 represents the BSTM signal generated by the comparator 551. The second row 822 represents the BKM signal generated by the comparator 553. The third row 823 represents the PWM signal generated by the first latch 512. The fourth row 824 represents the threshold voltage and the ramp fed into the comparator 602. The fifth row 825 represents the output voltage of the AND gate 601. The sixth row 826 represents the PWM signal generated by the second latch 519. The seventh row 827 represents the threshold voltage and the ramp fed into the comparator 612. The eighth row 828 represents the output voltage of the OR gate 611. The ninth row 829 represents the detected current signal and the error amplifier voltage fed into the valley current comparator 514. The tenth row 830 represents the output voltage of the valley current comparator 514. The eleventh row 831 represents the gate drive signal of the switch Q1. The twelfth row 832 represents the gate drive signal of the switch Q2. The thirteenth row 833 represents the gate drive signal of the switch Q3. The fourteenth row 834 represents the gate drive signal of the switch Q4.

The timing diagram shown in FIG. 10 is similar to that shown in FIG. 4 except that the BSTM signal and the BKM signal are employed to determine the operating mode of the buck-boost converter. In the buck-boost operating mode, both the BSTM signal and the BKM signal are of a logic high state as shown in FIG. 10. The logic high state of the BSTM signal is used to enable the boost converter portion. As shown in FIG. 10, both Q3 and Q4 are turned on and off in each switching cycle. The logic high state of the BKM signal is used to enable the buck converter portion. As shown in FIG. 20, both Q1 and Q2 are turned on and off in each switching cycle.

Figure 11:
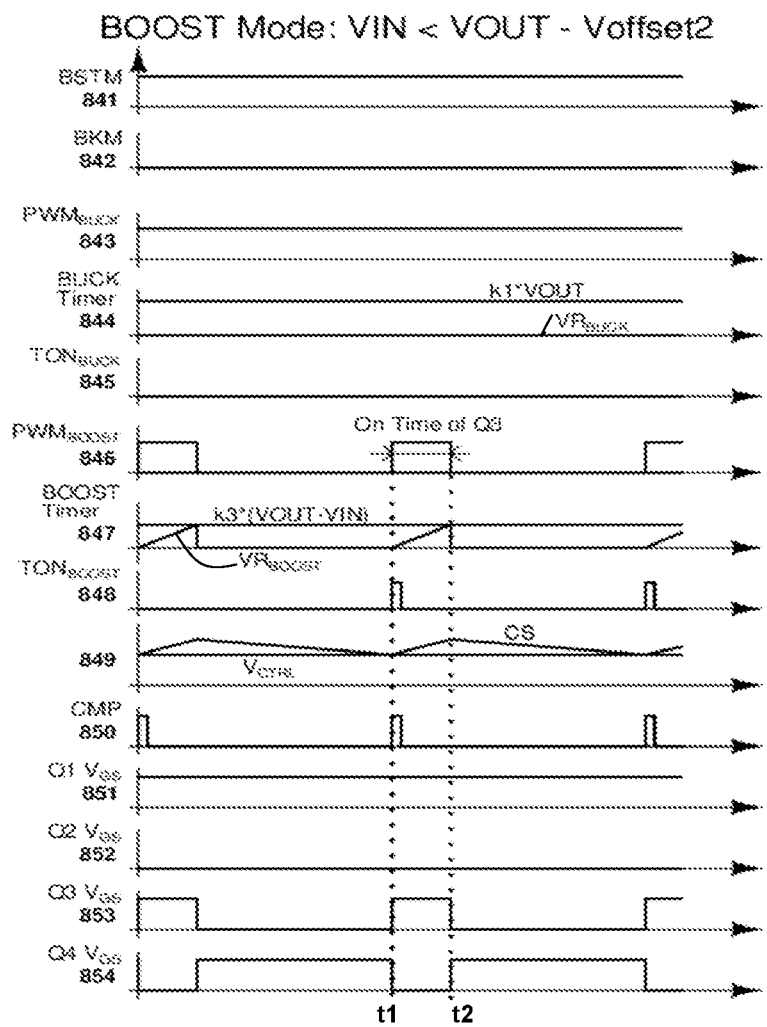
FIG. 11 illustrates timing diagrams associated with the boost operating mode of the buck-boost converter shown in FIG. 6 in accordance with various embodiments of the present disclosure.

FIG. 11 illustrates timing diagrams associated with the boost operating mode of the buck-boost converter shown in FIG. 6 in accordance with various embodiments of the present disclosure. The horizontal axis of FIG. 11 represents intervals of time. There are fourteen rows. The first row 841 represents the BSTM signal generated by the comparator 551. The second row 842 represents the BKM signal generated by the comparator 553. The third row 843 represents the PWM signal generated by the first latch 512. The fourth row 844 represents the threshold voltage and the ramp fed into the comparator 602. The fifth row 845 represents the output voltage of the AND gate 601. The sixth row 846 represents the PWM signal generated by the second latch 519. The seventh row 847 represents the threshold voltage and the ramp fed into the comparator 612. The eighth row 848 represents the output voltage of the OR gate 611. The ninth row 849 represents the detected current signal and the error amplifier voltage fed into the valley current comparator 514. The tenth row 850 represents the output voltage of the valley current comparator 514. The eleventh row 851 represents the gate drive signal of the switch Q1. The twelfth row 852 represents the gate drive signal of the switch Q2. The thirteenth row 853 represents the gate drive signal of the switch Q3. The fourteenth row 854 represents the gate drive signal of the switch Q4.

The timing diagram shown in FIG. 11 is similar to that shown in FIG. 5 except that the BSTM signal and the BKM signal are employed to determine the operating mode of the buck-boost converter. In the boost operating mode, the BSTM signal is of a logic high state as shown in FIG. 11. The BKM signal is of a logic low state as shown in FIG. 11. The logic low state of the BKM signal is used to disable the buck operating mode. As shown in FIG. 11, the $PWM_{BUCK}$ signal is of a logic high state. Such a logic high state keeps Q2 always off and Q1 always on. The logic high state of the BSTM signal is fed into the OR gate 611. The logic high signal of BSTM has no impact on the operation of the boost converter portion.

Figure 12:
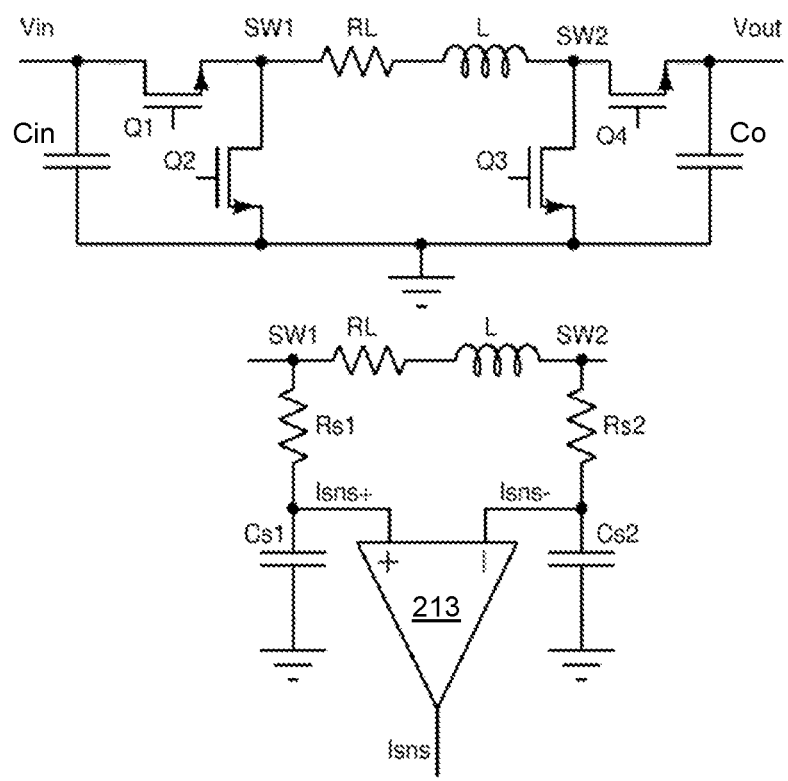
FIG. 12 illustrates a schematic diagram of a first implementation of a current sensing circuit for detecting the current flowing through the inductor of the buck-boost converter in accordance with various embodiments of the present disclosure.

FIG. 12 illustrates a schematic diagram of a first implementation of a current sensing circuit for detecting the current flowing through the inductor of the buck-boost converter in accordance with various embodiments of the present disclosure. Referring back to FIG. 1 and FIG. 6, a current sensing device such as a dc resistance (DCR) current sensing device may be employed to detect the current flowing through the inductor of the buck-boost converter. FIG. 12 illustrates a schematic diagram of a first implementation of the DCR current sensing device. As shown in FIG. 12, the inductor is connected between switching nodes SW1 and SW2. RL represents the equivalent series resistance of the inductor. RL is connected in series with the inductor L as shown in FIG. 12.

The DCR current sensing device comprises Rs1, Rs2, Cs1 and Cs2 as shown in FIG. 12. Rs1 and Cs1 are connected in series between switching node SW1 and ground. Rs2 and Cs2 are connected in series between switching node SW2 and ground. The common node of Rs1 and Cs1 is connected to the non-inverting input of the current sensing amplifier 213. The common node of Rs2 and Cs2 is connected to the inverting input of the current sensing amplifier 213. In some embodiments, the DCR sensing device is integrated with the control circuitry as well as the power devices.

SW1 and SW2 are switching nodes. Rs1, Rs2, Cs1 and Cs2 form two filters, which can filter out the pulsating voltages at SW1 and SW2 and convert the pulsating voltages into suitable dc voltages fed into the current sensing amplifier 213. In order to better attenuate the pulsating voltages, the component values of the two filters are given by the following equations:

$$Rs1 = Rs2 = Rs \qquad (3)$$

$$Cs1 = Cs2 = Cs \qquad (4)$$

$$Cs = \frac{L}{R_L} \cdot \frac{1}{Rs} \qquad (5)$$

In the equations above, L is the inductance of the buck-boost converter. RL is the equivalent series resistance of the inductor. Rs is the resistance value of the sensing resistors (Rs1 and Rs2). Cs is the capacitance value of the sensing capacitors (Cs1 and Cs2). In some embodiments, the voltage between Isns+ and Isns− is proportional to the current flowing through the inductor L.

Figure 13:
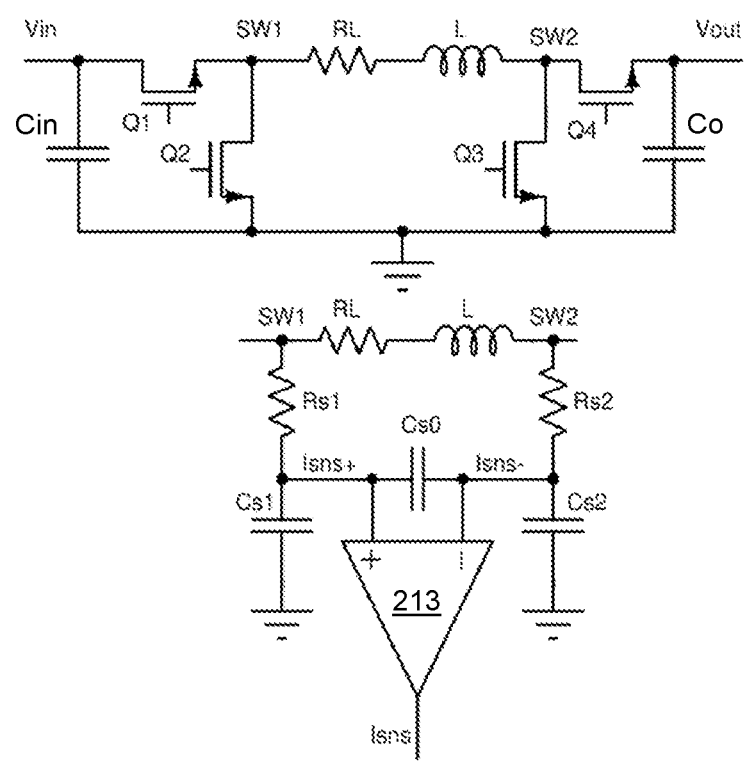
FIG. 13 illustrates a schematic diagram of a second implementation of a current sensing circuit for detecting the current flowing through the inductor of the buck-boost converter in accordance with various embodiments of the present disclosure.

FIG. 13 illustrates a schematic diagram of a second implementation of a current sensing circuit for detecting the current flowing through the inductor of the buck-boost converter in accordance with various embodiments of the present disclosure. The current sensing circuit shown in FIG. 13 is similar to the current sensing circuit shown in FIG. 12 except that a capacitor Cs0 is placed between the two inputs of the current sensing amplifier 213. In this implementation, the component values of the two filters are given by the following equations:

$$Rs1 = Rs2 = Rs \qquad (6)$$

$$Cs1 = Cs2 \qquad (7)$$

$$Cs0 = A \cdot Cs1 \qquad (8)$$

$$Cs1 = Cs2 = \frac{L}{R_L} \cdot \frac{1}{Rs} \cdot \frac{1}{A + 0.5} \qquad (9)$$

$$Cs0 = \frac{L}{R_L} \cdot \frac{1}{Rs} \cdot \frac{A}{A + 0.5} \qquad (10)$$

One advantageous feature of having Cs0 is that this capacitor helps to reduce the sensing error caused by the mismatch between Cs1 and Cs2. As shown in FIG. 13, capacitors Cs1 and Cs2 are connected to SW1 and SW2 respectively. The mismatch between those two capacitors may cause a significant error to the sensed voltage (the voltage between the two inputs of the current sensing amplifier 213). Since the sensed output is in the range of tens of mV, the performance of the current sensing circuit relies heavily on the matching between the two capacitors (Cs1 and Cs2). Another issue is related to the voltage coefficient of the capacitors. The dc voltage on the capacitors may vary in a wide range in response to different input and output voltages. With different dc bias voltages, the actual capacitance of the ceramic capacitor (e.g., Cs1 and Cs2) may vary significantly.

In the implementation shown in FIG. 13, the ratio of Cs0/Cs1 or Cs0/Cs2 is much greater than 1. In other words, A is much greater than 1. A is a predetermined value. By selecting a suitable A, the mismatch of the voltage coefficient of Cs1 and Cs2 may have a minor impact on the sensing performance. At the same time, the voltage variation on Cs (Cs1 and Cs2) is close to zero. As a result, the DCR sensing circuit does not have the voltage coefficient issue.

Figure 14:
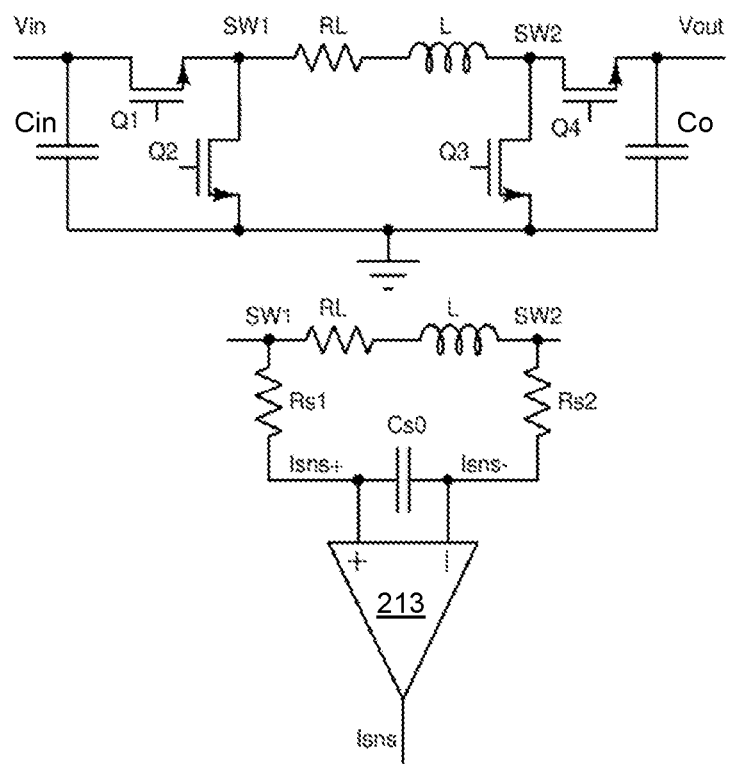
FIG. 14 illustrates a schematic diagram of a third implementation of a current sensing circuit for detecting the current flowing through the inductor of the buck-boost converter in accordance with various embodiments of the present disclosure.

FIG. 14 illustrates a schematic diagram of a third implementation of a current sensing circuit for detecting the current flowing through the inductor of the buck-boost converter in accordance with various embodiments of the present disclosure. The current sensing circuit shown in FIG. 14 is similar to the current sensing circuit shown in FIG. 13 except that the current sensing circuit is further simplified by eliminating Cs1 and Cs2. In this implementation, the component values of the two filters are given by the following equation:

$$Cs0 = \frac{L}{R_L} \cdot \frac{1}{Rs} \quad (11)$$

In the equation above, Rs is the resistance value of Rs1 and Rs2.

Figure 15:
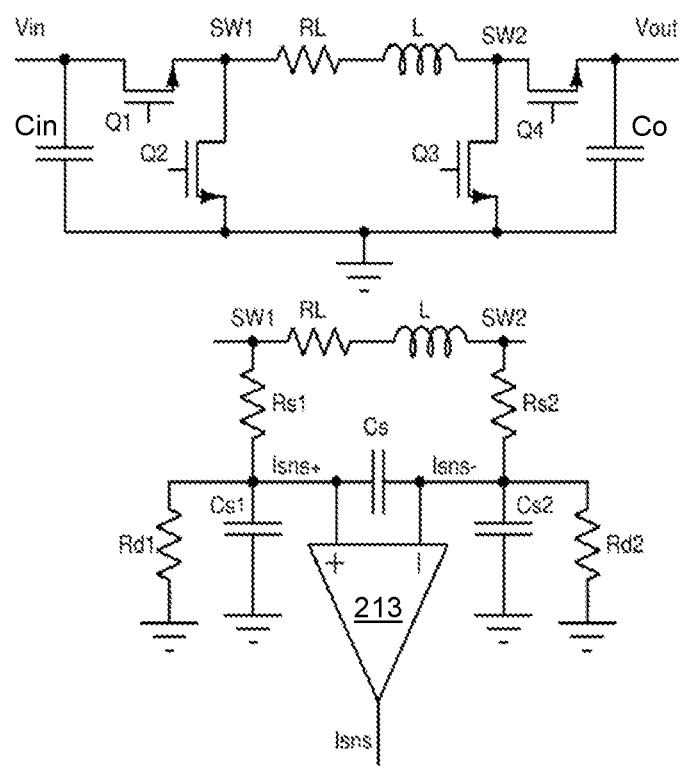
FIG. 15 illustrates a schematic diagram of a fourth implementation of a current sensing circuit for detecting the current flowing through the inductor of the buck-boost converter in accordance with various embodiments of the present disclosure.

FIG. 15 illustrates a schematic diagram of a fourth implementation of a current sensing circuit for detecting the current flowing through the inductor of the buck-boost converter in accordance with various embodiments of the present disclosure. The current sensing circuit shown in FIG. 15 is similar to the current sensing circuit shown in FIG. 13 except that two additional resistors Rd1 and Rd2 are added into the current sensing circuit. With these two resistors, the voltages on Isns+ and Isns− are always lower than the input voltage or the output voltage. This circuit can simplify the design of the current sensing amplifier. The component values of the current sensing circuit are given by the following equation:

$$Rs1 = Rs2 = Rs0 \quad (12)$$

$$Rd1 = Rd2 = Rd0 \quad (13)$$

$$Cs1 = Cs2 \quad (14)$$

$$Cs0 = A \cdot Cs1 \quad (15)$$

$$Rs = \frac{Rs0 \cdot Rd0}{Rs0 + Rd0} \quad (16)$$

$$Cs = Cs0 + \frac{Cs1}{2} = (A + 0.5) \cdot Cs1 \quad (17)$$

$$Cs = \frac{L}{R_L} \cdot \frac{1}{2 \cdot Rs} \quad (18)$$

$$Cs1 = \frac{Cs}{A + 0.5} \quad (19)$$

$$Cs0 = \frac{A \cdot Cs}{A + 0.5} \quad (20)$$

Figure 16:
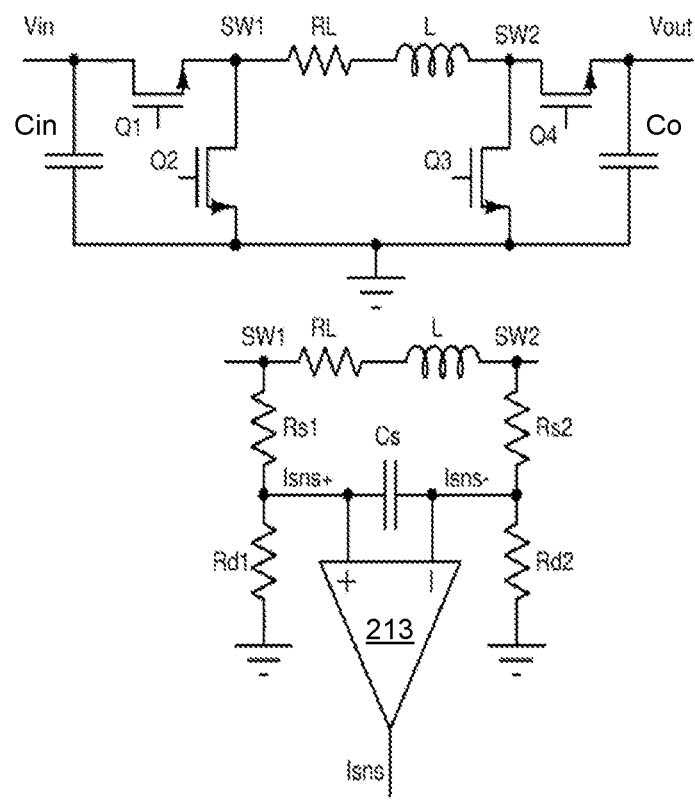
FIG. 16 illustrates a schematic diagram of a fifth implementation of a current sensing circuit for detecting the current flowing through the inductor of the buck-boost converter in accordance with various embodiments of the present disclosure.

FIG. 16 illustrates a schematic diagram of a fifth implementation of a current sensing circuit for detecting the current flowing through the inductor of the buck-boost converter in accordance with various embodiments of the present disclosure. The current sensing circuit shown in FIG. 16 is similar to the current sensing circuit shown in FIG. 15 except that the current sensing circuit has been simplified through eliminating Cs1 and Cs2. Cs0 is determined by the following equation:

$$Cs0 = \frac{L}{R_L} \cdot \frac{1}{2 \cdot Rs} \quad (21)$$

$$Rs = \frac{Rs0 \cdot Rd0}{Rs0 + Rd0} \quad (22)$$

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a buck-boost converter comprising a buck portion and a boost portion connected in cascade; and
a controller comprising a first timer and a second timer, wherein:
the first timer is configured to determine a turn-on time of a high-side switch of the buck portion, and wherein the first timer determines the turn-on time of the high-side switch of the buck portion based on a comparison between a first signal and a second signal, and wherein the first signal is proportional to an output voltage of the buck-boost converter and the second signal is generated based on a signal proportional to an input voltage of the buck-boost converter; and
the second timer is configured to determine a turn-on time of a low-side switch of the boost portion.

2. The apparatus of claim 1, wherein:
the second timer determines the turn-on time of the low-side switch of the boost portion based on a comparison between a third signal and a fourth signal, and wherein the third signal is proportional to a difference between the output voltage of the buck-boost converter and the input voltage of the buck-boost converter, and the fourth signal is generated based on a signal proportional to the output voltage of the buck-boost converter.

3. The apparatus of claim 2, wherein the second timer comprises:
a second current source having a current level proportional to the output voltage of the buck-boost converter; and
a second capacitor and a second switch connected in parallel, and wherein the second current source is configured to charge the second capacitor, and the second switch is configured to reset the second capacitor.

4. The apparatus of claim 3, further comprising:
a second bias source connected in series with the second capacitor, wherein the fourth signal is equal to a difference between a voltage across the second capacitor and an output voltage of the second bias source.

5. The apparatus of claim 2, wherein:
the third signal is a second threshold; and
the fourth signal is a second ramp.

6. The apparatus of claim 1, wherein the first timer comprises:
a first current source having a current level proportional to the input voltage of the buck-boost converter; and
a first capacitor and a first switch connected in parallel, and wherein the first current source is configured to charge the first capacitor, and the first switch is configured to reset the first capacitor.

7. The apparatus of claim 6, further comprising:
a first bias source connected in series with the first capacitor, wherein the second signal is equal to a difference between a voltage across the first capacitor and an output voltage of the first bias source.

8. The apparatus of claim 1, wherein:
the first signal is a first threshold; and
the second signal is a first ramp.

9. The apparatus of claim 1, further comprising:
a comparator having a first input configured to receive a current signal representing a current flowing through the buck-boost converter, and a second input configured to receive an error voltage signal generated by comparing the output voltage of the buck-boost converter with a predetermined reference.

10. The apparatus of claim 9, wherein:
the current signal is generated by a dc resistance (DCR) current sensing device.

11. A method comprising:
generating a first ramp using a first current source having a current level proportional to an input voltage of a buck-boost converter, and a second ramp using a second current source having a current level proportional to an output voltage of the buck-boost converter;
generating a first threshold voltage proportional to the output voltage of the buck-boost converter, and a second threshold voltage proportional to a difference between the output voltage and the input voltage of the buck-boost converter;
terminating a gate drive signal of a first high-side switch of the buck-boost converter based upon comparing the first ramp with the first threshold voltage; and
terminating a gate drive signal of a second low-side switch of the buck-boost converter based upon comparing the second ramp with the second threshold voltage.

12. The method of claim 11, the buck-boost converter comprises:
the first high-side switch and a first low-side switch connected in series between two input terminals of the buck-boost converter;
a second high-side switch and the second low-side switch connected in series between two output terminals of the buck-boost converter; and
an inductor connected between a common node of the first high-side switch and the first low-side switch, and a common node of the second high-side switch and the second low-side switch.

13. The method of claim 12, further comprising:
comparing the first threshold voltage with a difference between the first ramp and a first predetermined bias voltage to generate a termination signal for turning off the first high-side switch of the buck-boost converter; and comparing the second threshold voltage with a difference between the second ramp and a second predetermined bias voltage to generate a termination signal for turning off the second low-side switch of the buck-boost converter.

14. The method of claim 11, further comprising:
determining an on-time of a first low-side switch and an on-time of a second high-side switch of the buck-boost converter based upon comparing a current signal representing a current flowing through the buck-boost converter and an output signal of an error amplifier.

15. The method of claim 14, wherein:
a first input of the error amplifier is configured to receive a predetermined reference; and
a second input of the error amplifier is configured to detect a voltage signal proportional to the output voltage of the buck-boost converter.

16. An apparatus comprising:
a buck-boost converter comprising a first high-side switch and a first low-side switch connected in series between two input terminals of the buck-boost converter, a second high-side switch and a second low-side switch connected in series between two output terminals of the buck-boost converter, and an inductor connected between a common node of the first high-side switch and the first low-side switch, and a common node of the second high-side switch and the second low-side switch; and
a controller comprising a first timer and a second timer, wherein the first timer is configured to determine a turn-on time of the first high-side switch, and the second timer is configured to determine a turn-on time of the second low-side switch, and wherein the second timer determines the turn-on time of the second low-side switch based on a comparison between a first signal and a second signal, and wherein the first signal is proportional to a difference between an output voltage and an input voltage of the buck-boost converter, and the second signal is generated based on a signal proportional to the output voltage of the buck-boost converter.

17. The apparatus of claim 16, wherein:
the first timer determines the turn-on time of the first high-side switch based on a comparison between a third signal and a fourth signal, and wherein the third signal is proportional to the output voltage of the buck-boost converter, and the second signal is generated based on a signal proportional to the input voltage of the buck-boost converter.

18. The apparatus of claim 16, further comprising:
a comparator having a first input configured to receive a current signal representing a current flowing through the buck-boost converter, and a second input configured to receive an error voltage signal, wherein an output signal of the comparator determines a turn-on time of the first low-side switch and a turn-on time of the second high-side switch.

19. The apparatus of claim 18, wherein:
the error voltage signal is generated by an error amplifier having a first input configured to receive a predetermined reference and a second input configured to detect a voltage signal proportional to the output voltage of the buck-boost converter.

20. The apparatus of claim 18, wherein:
the current signal is proportional to a current flowing through the inductor of the buck-boost converter, and the current signal is generated by a dc resistance (DCR) current sensing device.

* * * * *